Figure 1:
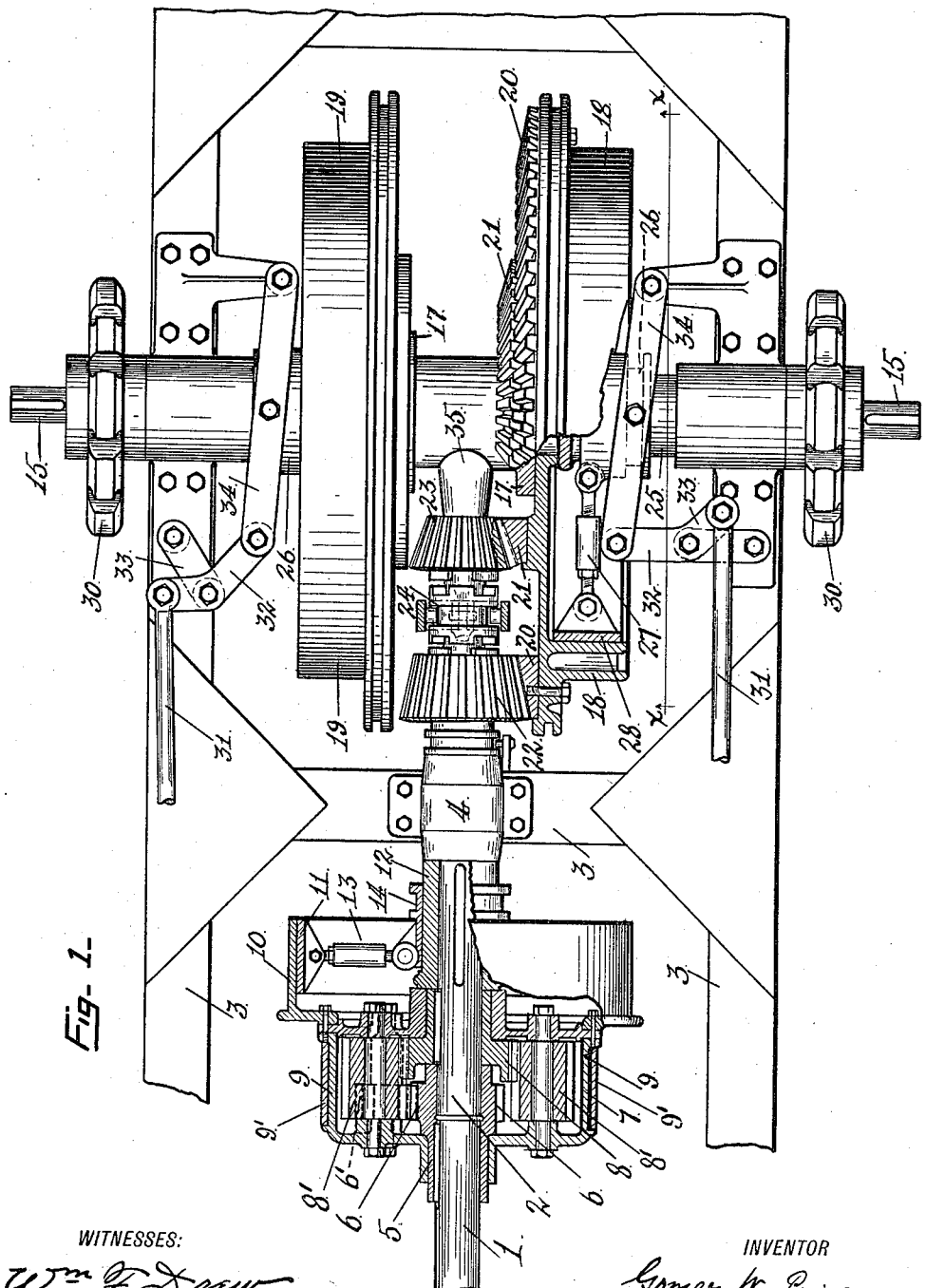

G. W. PRICE.
CHANGEABLE SPEED TRANSMISSION MECHANISM.
APPLICATION FILED DEC. 29, 1914.

1,153,569.

Patented Sept. 14, 1915.
3 SHEETS—SHEET 1.

WITNESSES:

INVENTOR
Gomer W. Price
BY
Booth
ATTORNEY

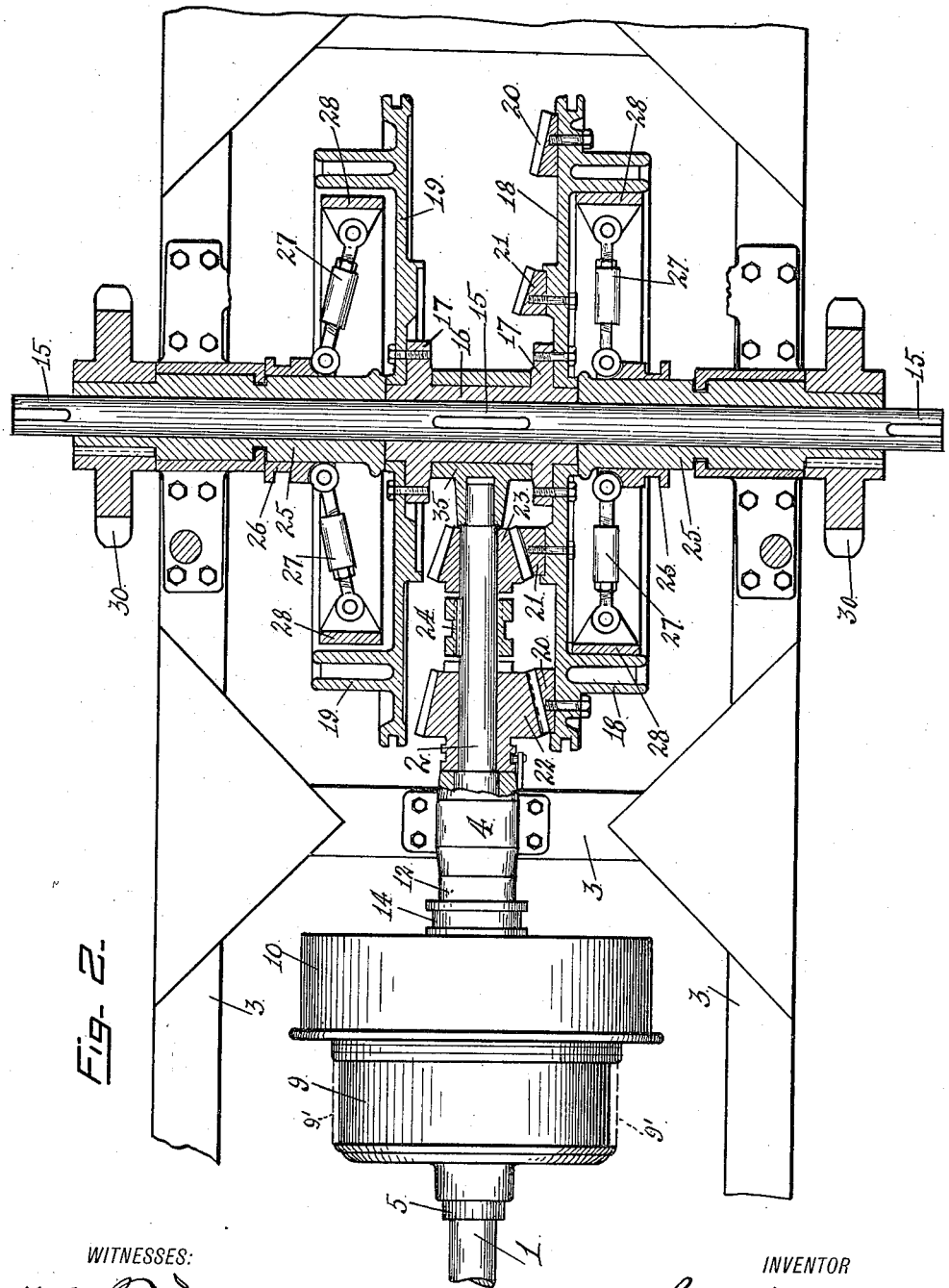

G. W. PRICE.
CHANGEABLE SPEED TRANSMISSION MECHANISM.
APPLICATION FILED DEC. 29, 1914.
1,153,569.
Patented Sept. 14, 1915.
3 SHEETS—SHEET 3.
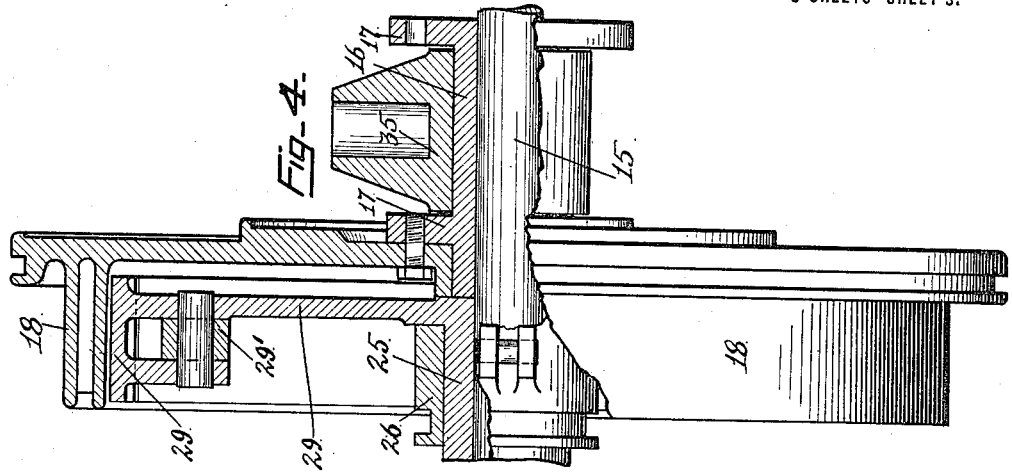
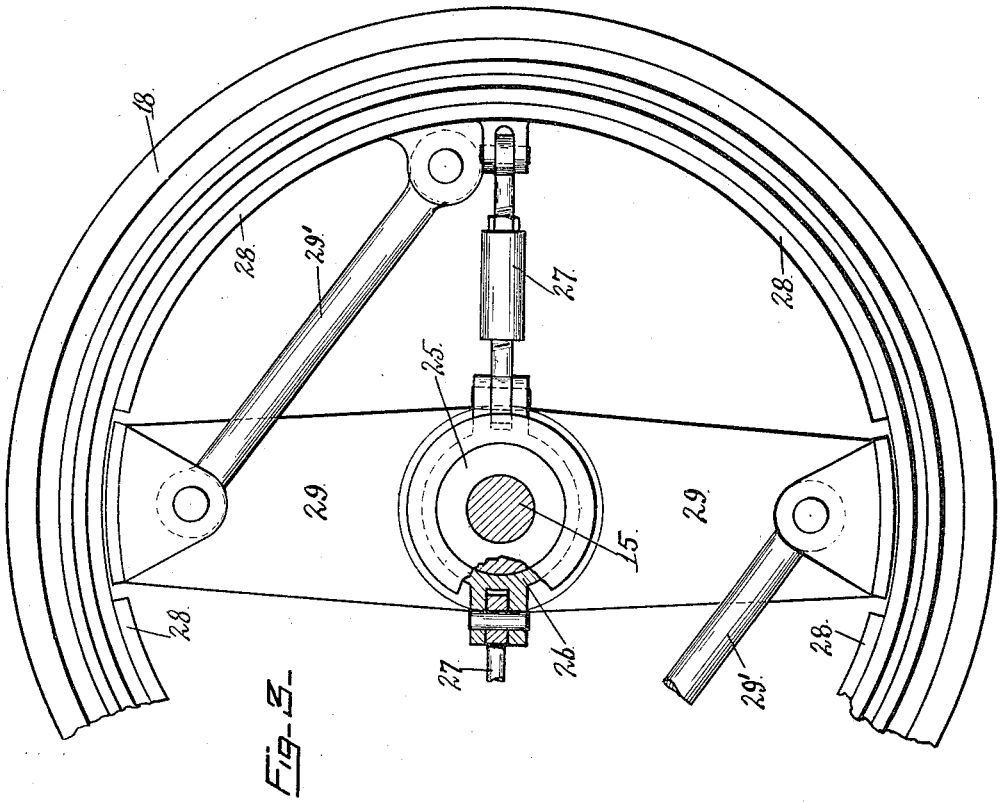
WITNESSES:
INVENTOR
Gomer W. Price
BY
ATTORNEY

UNITED STATES PATENT OFFICE.

GOMER W. PRICE, OF OAKLAND, CALIFORNIA, ASSIGNOR TO HENRY L. SMITH, OF SAN RAFAEL, CALIFORNIA.

CHANGEABLE-SPEED-TRANSMISSION MECHANISM.

1,153,569. Specification of Letters Patent. Patented Sept. 14, 1915.

Application filed December 29, 1914. Serial No. 879,568.

*To all whom it may concern:*

Be it known that I, GOMER W. PRICE, a citizen of the United States, residing at Oakland, in the county of Alameda and State of California, have invented certain new and useful Improvements in Changeable-Speed-Transmission Mechanisms, of which the following is a specification.

My invention relates to changeable-speed transmission mechanisms, as applied to self-propelled vehicles, particularly traction-engines.

The object of my invention is to provide a simple and effective change-speed mechanism adapted for tractors; and to this end my invention consists in the novel mechanism which I shall now fully describe by reference to the accompanying drawings, in which—

Figure 1 is a plan view of my transmission mechanism, the "planetary" reverse being in section. Fig. 2 is a plan view of the same, the bevel drives being in section. Fig. 3 is a section, enlarged, on the line $x$—$x$ of Fig. 1, showing in side elevation, broken, the clutch drums and clutch spider. Fig. 4 is an edge view of the same, half in elevation and half in central section.

1 is the driving shaft.

2 is the driven shaft.

3 is the vehicle frame and 4 is a bearing on said frame for the driven shaft.

The driving shaft is connected with the driven shaft both for forward rotation and for reverse, by a gear assembly of the planetary type. This may be of any approved form. I have for illustration, shown a simple familiar construction, the details of which are sufficiently shown in Fig. 1. Keyed on the driving shaft is a hub 5, which has the driving pinion 6. Keyed on the driven shaft is a hub 7 which has the driven pinion 8. 9 is a housing or case usually termed a pinion-carrier. The hub of this case at one end is fitted to rotate on the hub 5 of the driving shaft pinion, and at its other end is rotatably mounted on the hub 7 of the driven shaft pinion. The case 9 carries the usual assembly of planetary pinions. One set 6′ engages with the driving shaft pinion 6 and another set 8′ engages with the driven shaft pinion 8. The pinions 6′ and 8′ also interengage. 9′ is the usual brake-band for the case 9. It will be seen from this arrangement that when the case 9 is held stationary by the brake-band 9′ the motion of the driven shaft is reversed.

For the forward drive, the case 9 is locked to the driven shaft. This is done by a suitable clutch device, of which 10 is a clutch drum bolted to the case 9. 11 is an expanding spider engaging said drum, said spider having a hub 12 keyed on the driven-shaft 2. The expansion and contraction of said spider, in order to engage and to release the clutch drum 10, is effected through its toggle rods 13 and the sliding collar 14 mounted freely on the spider hub 12. The details of this clutch are more fully shown in Figs. 3 and 4, which illustrate a similar clutch in another part of the mechanism.

Normally the spider engages the clutch drum so that forward rotation is transmitted through the case 9, but when the clutch drum is released by the contraction of the clutch spider, the case 9 is free from the shaft and can be held by its brake-band to effect the reversal of the driven shaft. The neutral position is, of course, that in which the case is free so that its pinions travel around in true planetary style.

The speeds forward and reverse—one, two, three or more in number, (for simplicity two being here shown), a high and a low, are obtained as follows: 15 is a shaft at right angles to the driven shaft. At its middle is keyed a hub 16, having flanges 17 at each end. To these flanges are bolted clutch drums 18 and 19. These are symmetrically oppositely disposed, but only one of them, namely 18, carries the changeable speed gears. These gears are concentric, the outer one—20—being for the low speed and the inner one 21 for the high speed. Freely mounted upon the driven shaft 2 is the low speed pinion 22 and the high speed pinion 23. These are severally to be connected with the driven shaft, by means of a clutch collar 24 slidably mounted on the shaft between the two pinions, with either of which it may be selectively thrown into engagement. Upon cross shaft 15, at each side of the median hub 16, is freely mounted a rotatable hub 25, upon which are slidably carried the clutch collars 26, one on each hub, said collars carrying the expansion toggles 27 of the clutch spiders 28 which engage and relieve the clutch drums 18 and 19. The hubs 25, as seen in Figs. 3 and 4, have arms 29, in the extremities of which are pivoted the connecting links 29' which lead to and are connected with the spiders 28. Upon the outer end of each hub 25 is carried the sprocket 30 from which the motion is to be transmitted to propel the vehicle. It will now be seen that when the clutch spiders 28 engage the clutch drums 18 and 19, the hubs 25 and their sprockets 30 will be rotated at low or high speed according to whether the low or high speed pinion is made fast on the driven shaft by the clutch collar 24. In order to throw the clutch-hubs 18 and 19 into and out of action, I show in Fig. 1, as means for sliding the clutch-collars 26, the rods 31, the levers 32, the lever links 33 and the collar-levers 34.

35 is a bearing for the end of the driven shaft 2.

In variable-speed transmissions of a type shown, for example, by the patent issued to me April 29, 1913, No. 1,060,024, the direct drives are effected through one clutch drum and the reverse is had through the other or opposing clutch drum. This necessitated movements and complications found to be not very satisfactory. But by confining the drive or drives to one clutch drum and using with this a planetary arrangement for the reverse, I have overcome previous drawbacks and am enabled to obtain forward drive and instantaneous reverse on all speeds, which, as far as I am now aware is a feature not found in any other tractor. A feature of importance to be noted in this construction is that the cross shaft 15 is capable of rotation independently of the motion transmitting devices which propel the vehicle. The propelling power being transmitted through the hubs 25, rotatably mounted on the cross shaft 15, is only called into action when the clutch spiders 28 are operated. When these spiders are contracted the hubs 25 are at rest and the vehicle is not propelled; but the cross shaft 15 is nevertheless driven from the shaft 2, through its pinion or pinions, the gear carrying clutch drum 18 and the median hub 16 keyed to said cross shaft. This cross shaft 15 may, therefore, be used to convey power for any supplementary or additional purpose without throwing the traction mechanism into action.

I claim:—

1. In changeable-speed transmission-mechanisms, the combination of a shaft; a pinion rotatably mounted on the shaft; means for throwing said pinion into and out of rotating connection with the said shaft; a cross shaft; a gear fixed thereto and co-acting with the pinion on the first named shaft; a clutch drum fixed to said cross-shaft adjacent to the gear thereon; a sleeve rotatable on the cross-shaft and carrying a power transmitting member; and a controllable clutch spider carried by said sleeve and adapted to engage and to relieve the clutch drum.

2. In changeable-speed transmission-mechanisms, the combination of a shaft; a pinion rotatably mounted on the shaft; means for throwing said pinion into and out of rotating connection with the said shaft; a cross shaft; a gear fixed thereto and co-acting with the pinion on the first named shaft; a sleeve rotatable on the cross shaft and carrying at one end thereof a power transmitting member; and a controllable friction clutch to throw said sleeve into and out of rotating connection with the cross shaft, one member of said clutch being carried by the gear upon said cross shaft, and the other member being fixed to said sleeve.

3. In changeable-speed transmission-mechanisms, the combination of a shaft; a cross-shaft; a clutch-drum carried by said cross-shaft, said drum carrying a gear; a hub rotatable on the cross-shaft and carrying a power transmitting member; a controllable clutch-spider carried by said hub and adapted to engage and to release the clutch-drum; and a pinion on the first named shaft meshing with the gear on the clutch-drum.

4. In changeable-speed transmission-mechanisms, the combination of a shaft; a cross-shaft; a pair of opposing clutch-drums carried by said cross-shaft, one only of said drums carrying gears of different diameters; a pair of independent hubs rotatable on the cross-shaft, each hub carrying a power transmitting member; independently controllable clutch-spiders, one carried by each hub and adapted to engage and release the clutch-drums independently; independent pinions freely revoluble on the first named shaft, said pinions meshing with the gears on the clutch-drum; and means for severally and selectively making said pinions fast on their shaft.

5. In changeable-speed transmission-mechanism, the combination of a shaft; a rotatable cross-shaft; means for rotating said cross-shaft from the first named shaft; a hub independently rotatable on the cross shaft and carrying a power-transmitting member; and means for throwing said hub into and out of rotating connection with the cross-shaft.

In testimony whereof I have signed my name to this specification in the presence of two subscribing witnesses.

GOMER W. PRICE.

Witnesses:
Wm. F. Booth,
D. B. Richards.